US009446471B2

(12) United States Patent
Hillen et al.

(10) Patent No.: US 9,446,471 B2
(45) Date of Patent: *Sep. 20, 2016

(54) SYSTEMS AND METHODS FOR COMMUNICATING WITH WELDING EQUIPMENT

(71) Applicant: Lincoln Global, Inc., City of Industry, CA (US)

(72) Inventors: Edward Hillen, Painesville, OH (US); Michael Volzer, Fairport Harbor, OH (US); Nick Trinnes, Cleveland Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/208,961

(22) Filed: Mar. 13, 2014

(65) Prior Publication Data

US 2014/0266576 A1 Sep. 18, 2014

Related U.S. Application Data

(60) Provisional application No. 61/795,000, filed on Mar. 15, 2013, provisional application No. 61/798,192, filed on Mar. 15, 2013, provisional application No. 61/798,915, filed on Mar. 15, 2013.

(51) Int. Cl.
| | |
|---|---|
| *G08B 21/00* | (2006.01) |
| *B23K 9/095* | (2006.01) |
| *G07C 9/00* | (2006.01) |
| *H04B 5/00* | (2006.01) |

(Continued)

(52) U.S. Cl.
CPC ............. *B23K 9/095* (2013.01); *B23K 9/0953* (2013.01); *B23K 9/32* (2013.01); *G07C 9/00111* (2013.01); *H04B 5/0025* (2013.01); *H04B 5/0031* (2013.01); *H04B 5/02* (2013.01); *Y10S 901/42* (2013.01)

(58) Field of Classification Search
CPC ...... B23K 9/095; B23K 9/0953; B23K 9/32; G07C 9/00111; H04B 5/0025; H04B 5/0031; Y10S 901/42
USPC .................................................. 340/5.2, 5.21
See application file for complete search history.

(56) References Cited

U.S. PATENT DOCUMENTS

| | | | |
|---|---|---|---|
| 5,278,390 | A | 1/1994 | Blankenship |
| 5,500,512 | A | 3/1996 | Goldblatt |
| 5,553,810 | A | 9/1996 | Bobeczko |

(Continued)

FOREIGN PATENT DOCUMENTS

| | | |
|---|---|---|
| WO | 2007/101131 | 9/2007 |
| WO | 2010/108235 | 9/2010 |

OTHER PUBLICATIONS

International Search Report and Written Opinion from PCT/IB2014/000351 dated Nov. 5, 2014.

(Continued)

*Primary Examiner* — Mark Rushing
(74) *Attorney, Agent, or Firm* — Calfee, Halter & Griswold LLP

(57) ABSTRACT

Systems and methods for reading data from and/or writing data to various components of a welding installation are provided. The data is exchanged between devices using near field communication.

6 Claims, 10 Drawing Sheets

(51) Int. Cl.
*B23K 9/32* (2006.01)
*H04B 5/02* (2006.01)

(56) References Cited

U.S. PATENT DOCUMENTS

| | | | |
|---|---|---|---|
| 5,708,253 A | 1/1998 | Bloch et al. | |
| 5,862,071 A | 1/1999 | Scholder | |
| 6,064,314 A * | 5/2000 | Ozaki | B23K 11/241 219/109 |
| 6,536,660 B2 | 3/2003 | Blankenship et al. | |
| 6,858,817 B2 | 2/2005 | Blankenship et al. | |
| 2004/0004113 A1* | 1/2004 | Blankenship | B23K 9/1062 235/375 |
| 2006/0169685 A1* | 8/2006 | Stanzel | B23K 9/323 219/137.31 |
| 2010/0217440 A1 | 8/2010 | Lindell | |
| 2011/0114616 A1 | 5/2011 | Albrecht | |
| 2013/0059534 A1 | 3/2013 | Sobalvarro et al. | |
| 2014/0124493 A1* | 5/2014 | Enyedy | B23K 9/1006 219/137 PS |

OTHER PUBLICATIONS

Miller, "What Every Engineer Should Know About Welding", Modern Steel Construction, May 1997, 10 pgs.
Digital Communications Technology, Lincoln Electric brochure, Nextweld, Mar. 2006, 12 pgs.
List of welding processes from Wikipedia, printed Mar. 15, 2013, 7 pgs.
Near field communication from Wikipedia, printed Mar. 4, 2013, 13 pgs.
International Preliminary Report on Patentability from PCT/IB2014/000351 dated Sep. 24, 2015.
International Preliminary Report on Patentability from PCT/IB2014/000357 dated Sep. 24, 2015.
International Search Report and Written Opinion from PCT/IB2014/000357 dated Aug. 11, 2014.

* cited by examiner

SYSTEMS AND METHODS FOR COMMUNICATING WITH WELDING EQUIPMENT

PRIORITY CLAIM

This application claims the benefit of and priority to three U.S. Provisional Patent Applications Nos. 61/795,000, 61/798,192 and 61/798,915, which were all filed on Mar. 15, 2013. These three provisional applications are hereby incorporated by reference in full in this application.

FIELD

The general inventive concepts relate, among other things, to electric arc welding and, more particularly, to systems and methods for exchanging data with welding-related equipment.

INCORPORATION BY REFERENCE

The following documents may be beneficial to a more thorough understanding and appreciation of the general inventive concepts set forth herein: U.S. Pat. No. 5,278,390 to Blankenship; U.S. Pat. No. 5,500,512 to Goldblatt; U.S. Pat. No. 5,553,810 to Bobeczko; U.S. Pat. No. 5,708,253 to Bloch et al.; U.S. Pat. No. 5,862,071 to Scholder; U.S. Pat. No. 6,536,660 to Blankenship et al.; and U.S. Pat. No. 6,858,817 to Blankenship et al.; the article entitled What Every Engineer Should Know about Welding, D. K. Miller (1997) (attached hereto as Appendix 1); and the publication entitled Digital Communications Technology (Lincoln Electric 2006) (attached hereto as Appendix 2). Accordingly, each of these documents is hereby incorporated herein by reference in its entirety.

BACKGROUND

Near field communication, abbreviated NFC, is a form of contactless communication between devices like smartphones or tablets. NFC encompasses a set of standards for such devices, which are often handheld or otherwise mobile, to establish radio communication with each other by touching them together or bringing them into close proximity, usually no more than a few centimeters. NFC peer-to-peer communication is possible provided both devices are powered. Communication is also possible between an NFC device and an unpowered NFC chip, often called a "passive tag" or simply "tag."

NFC is a short-range, low-power communications protocol between two devices. An initiator device uses magnetic induction to create a radio-wave field that a target device can detect and access, allowing small amounts of data to be transferred wirelessly over a relatively short distance (e.g., less than 10 cm). More specifically, by using magnetic induction, the initiator device emits a small electric current, which creates a magnetic field that in turn bridges the physical space between the initiator device and the target device. The field is received by a similar coil in the target device, where it is turned back into electrical impulses to communicate data such as status information or any other information. So-called "passive" NFC tags use the energy from the initiator device to encode their response, while "active" or "peer-to-peer" tags have their own power source and respond to the initiator device using their own electromagnetic fields. Thus, NFC transmissions typically encompass two modes. In a passive communication mode, the initiator device provides a carrier field and the target device answers by modulating the existing field. In this mode, the target device may draw its operating power from the initiator-provided electromagnetic field, thus making the target device a transponder. In an active communication mode, both the initiator device and the target device communicate by alternately generating their own fields. A device deactivates its radio frequency (RF) field while it is waiting for data. In this mode, both devices typically have power supplies.

NFC devices may be able to receive and transmit data at the same time. Accordingly, the devices can check for potential collisions if the received signal frequency does not match with the transmitted signal's frequency.

NFC operates within the globally available and unlicensed radio frequency ISM band of 13.56 MHz. Most of the RF energy is concentrated in the allowed ±7 kHz bandwidth range, but the full spectral envelope may be as wide as 1.8 MHz when using ASK modulation. The working distance with compact standard antennas may extend up to 20 cm, but the practical working distance is smaller.

NFC transmissions are generally secure due to their short range and support for encryption. Applications will often use higher-layer cryptographic protocols (e.g., SSL) to establish a secure channel. Because loss of an NFC device may present a security issue, such devices are typically protected by additional security, such as an authentication code.

The NFC standards cover communications protocols and data exchange formats, which offer a secure connection with relatively simple setup, and can be used to bootstrap more capable wireless connections, such as Bluetooth and Wi-Fi connections.

Application of NFC transmissions and related communications to welding systems and methods are contemplated by the general inventive concepts, as shown and described herein.

BRIEF DESCRIPTION OF THE DRAWINGS

The general inventive concepts as well as embodiments and advantages thereof are described below in greater detail, by way of example, with reference to the drawings in which.

BRIEF SUMMARY

Figure 1:
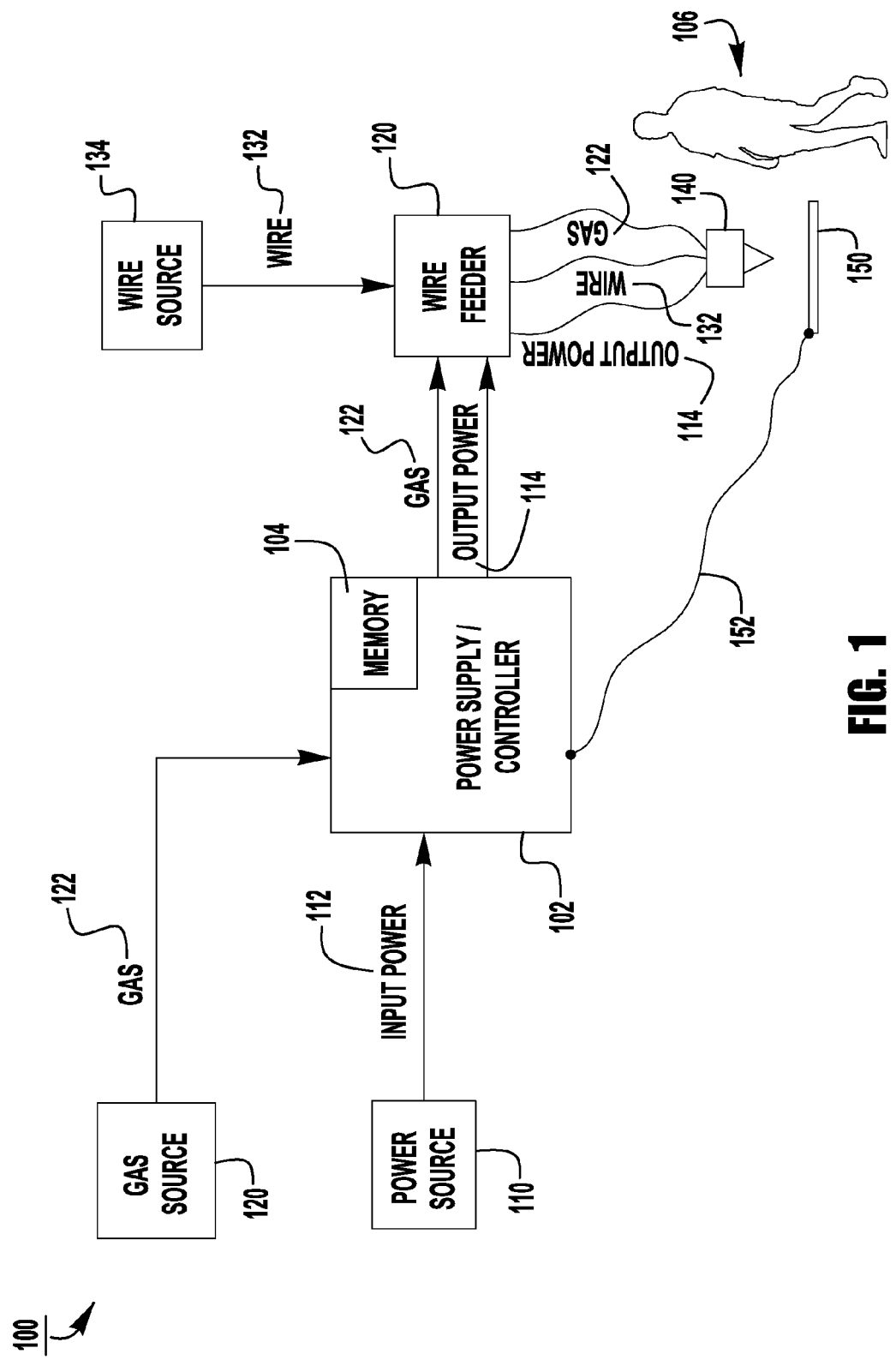
FIG. 1 is a schematic drawing of a MIG welding system.

Systems and methods for reading data from and/or writing data to various components of a welding installation are provided. The data is exchanged between devices using near field communication.

DETAILED DESCRIPTION

While the general inventive concepts are susceptible of embodiment in many different forms, there are shown in the drawings and will be described herein in detail specific embodiments thereof with the understanding that the present disclosure is to be considered as merely an exemplification of the principles of the general inventive concepts. Accordingly, the general inventive concepts are not intended to be limited to the specific embodiments illustrated herein.

The following are definitions of various terms that may be used throughout the disclosure. Both singular and plural forms of all terms fall within each meaning:

"Logic," synonymous with "circuit" as used herein includes, but is not limited to, hardware, firmware, software and/or combinations of each to perform a function(s) or an action(s). For example, based on a desired application or particular need(s), logic may include a software controlled microprocessor, discreet logic such as an application specific integrated circuit (ASIC), or other programmed logic device. In some instances, logic could also be fully embodied as software.

"Software" or "computer program" as used herein includes, but is not limited to, one or more computer readable and/or executable instructions that cause a computer or other electronic device to perform functions, initiate actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, the requirements of a particular application, the environment it runs on, and/or the desires of a designer/programmer or the like.

"Computer" or "processing unit" as used herein includes, but is not limited to, any programmed or programmable electronic device that can store, retrieve, and process data.

"Operator" as used herein includes, but is not limited to, any individual actually performing a welding operation, as well as any individual supervising or otherwise responsible for a welding operation (whether manual or automatic).

Electric arc welding is a complicated process wherein numerous interrelated and non-interrelated parameters affect the deposition of molten metal to a weld pool in performing a welding operation. Accordingly, many modern electric arc welders include memory or similar structure for storing information useful for performing or otherwise controlling welding processes. The information can include, for example, information directly related to the welding process, such as parameters for controlling the welder, and/or information indirectly related to the welding process, such as information on an operator performing the welding process or information related to a wire being used in the welding process. As another example, the information can include a welding waveform for a welding process. Systems and methods for efficiently, reliably, and securely inputting such information are desirable.

The general inventive concepts contemplate systems and methods which use NFC active and/or passive devices to read, write, and/or store information within a welding system, including amongst various components of the welding system (e.g., a power supply/controller) and operators thereof.

Metal inert gas (MIG) welding, a subset of gas metal arc welding (GMAW), is one type of electric arc welding. MIG welding is a welding process in which an electric arc forms between a consumable wire electrode and workpiece metals, causing the metals, along with the wire, to melt and join. Along with the wire electrode, a shielding gas is often fed through a welding gun or torch to shield the process from contaminants (e.g., oxygen, nitrogen) in the air. While the various exemplary embodiments set forth herein may be directed to one or more specific types of welding processes, the general inventive concepts are not intended to be limited to these specific types of welding processes and may find applicability with any suitable welding process.

A conventional MIG welding system 100 is shown in FIG. 1. In the MIG welding system 100, a welding unit (welder) 102 functions as a power supply and controller for a welding process. The welder 102 includes a memory 104 or similar logic for storing information relating to the welding process. For example, the information could be stored in the memory by an operator 106 manually programming or otherwise interacting with the welder 102.

The welder 102 is connected to a power source 110 that supplies the necessary input power 112 to operate the welder 102. The welder 102 may condition the input power 112 to produce a consistent or otherwise controlled output power 114 suitable for the welding process.

The welder 102 is also connected to a gas source 120 that supplies a shielding gas 122 for the welding process. A gas regulator may be used to regulate a pressure of the shielding gas 122 for controlled delivery to the welder 102.

The welder 102 is also connected to a wire feeder 130. The wire feeder 130 receives a welding wire 132 from a wire source 134, such as a spool or barrel of wire. The wire feeder 130 includes a motor or the like for paying out the welding wire 132 to a welding torch 140, gun, or the like. The wire feeder 130 may advance the welding wire 132 in response to action by the operator 106, such as the operator 106 pressing a switch on the torch 140.

In the illustrated embodiment, the output power 114 and/or the shielding gas 122 are also fed (e.g., using cables) through the wire feeder 130 to the welding torch 140. In another embodiment, the output power 114 and/or the shielding gas 122 can be fed directly from the welder 102 to the welding torch 140.

At least one workpiece 150 to be welded is also provided. The workpiece 150 is connected to the welder 102 by a ground cable 152 or the like.

Figure 2:
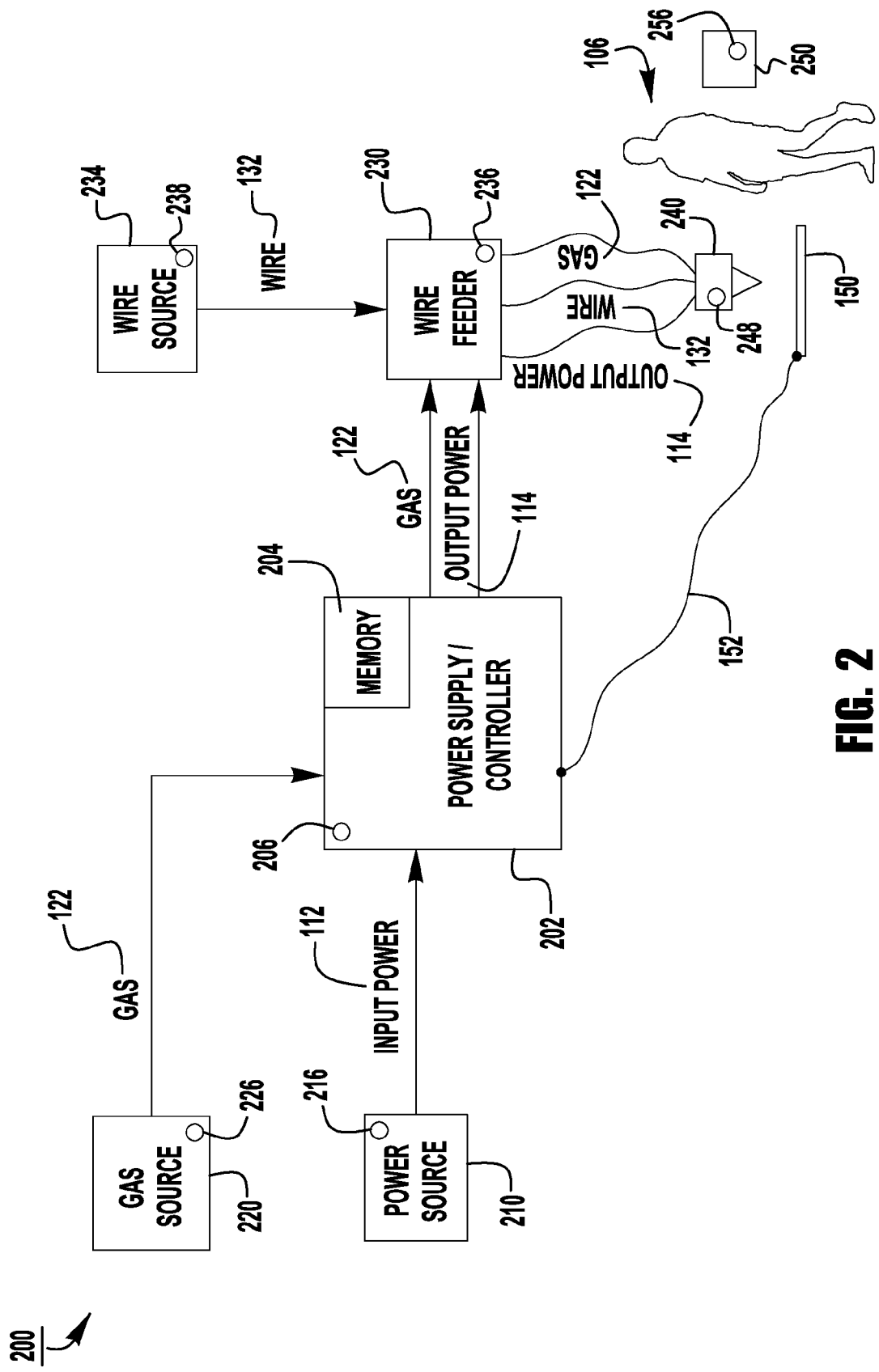
FIG. 2 is an embodiment of a welding system incorporating NFC logic and NFC capable devices.

A MIG welding system 200, according to one exemplary embodiment of the general inventive concepts, is shown in FIG. 2. As described herein, one or more components of the MIG welding system 200 are NFC-capable components. Accordingly, data can be read from and/or written to these components resulting in a more dynamic welding system.

In the MIG welding system 200, a welding unit (welder) 202 functions as a power supply and controller for a welding process. The power supply and the controller for the welding process could also be discrete units. The welder 202 can include a processing unit (not shown) for implementing and/or assisting with these (and other) functions. The processing unit can be an internal component of the welder 202, or an external component which the welder 202 accesses (e.g., over a network).

The welder 202 also includes a memory 204 or similar logic for storing information relating to the welding process. The information can be stored in the memory at any time. For example, the information could be stored in the memory 204 when the welder 202 is manufactured. As another example, the information could be stored in the memory 204 or otherwise updated after installation of the welder 202, such as by the operator 106.

The welder 202 can include NFC logic 206 including any related logic, software, structure, and the like, such as a power supply. The NFC logic 206 renders the welder 202 capable of sending and/or receiving NFC transmissions.

The welder 202 is connected to a power source 210 that supplies the necessary input power 112 to operate the welder 202. The welder 202 may condition or otherwise alter the input power 112 to produce a consistent or otherwise controlled output power 114 suitable for the welding process.

The power source 210 can include NFC logic 216 including any related logic, software, structure, and the like, such as a power supply. The NFC logic 216 renders the power source 210 capable of sending and/or receiving NFC transmissions.

The welder 202 is also connected to a gas source 220 that supplies a shielding gas 122 for the welding process. A gas regulator (not shown) may be used to regulate a pressure of the shielding gas 122 for controlled delivery to the welder 202.

The gas source 220 can include NFC logic 226 including any related logic, software, structure, and the like, such as a power supply. The NFC logic 226 renders the gas source 220 capable of sending and/or receiving NFC transmissions.

The welder 202 is also connected to a wire feeder 230. The wire feeder 230 receives a welding wire 132 from a wire source 234, such as a spool or barrel of wire. The wire feeder 230 includes a motor or the like for paying out the welding wire 132 to a welding torch 240, gun, or the like. The wire feeder 230 may advance the welding wire 132 in response to action by the operator 106, such as the operator 106 pressing a switch on the welding torch 240. In an automated (e.g., robotic) installation, the wire feeder 230 can automatically advance the welding wire 132 in accordance with a computer program or the like associated with the welding process.

The wire feeder 230 can include NFC logic 236 including any related logic, software, structure, and the like, such as a power supply. The NFC logic 236 renders the wire feeder 230 capable of sending and/or receiving NFC transmissions.

The wire source 234 can include NFC logic 238 including any related logic, software, structure, and the like, such as a power supply. The NFC logic 238 renders the wire source 234 capable of sending and/or receiving NFC transmissions.

The torch 240 can include NFC logic 248 including any related logic, software, structure, and the like, such as a power supply. The NFC logic 248 renders the torch 240 capable of sending and/or receiving NFC transmissions.

In one exemplary embodiment, the output power 114 and/or the shielding gas 122 are also fed (e.g., using cables) through the wire feeder 230 to the welding torch 240. In one exemplary embodiment, the output power 114 and/or the shielding gas 122 are fed directly from the welder 202 to the welding torch 240.

At least one workpiece 150 to be welded is also provided. The workpiece 150 is connected to the welder 202 by a ground cable 152 or the like.

Other components of or related to the MIG welding system 200 can include NFC logic including any related logic, software, structure, and the like, such as a power supply. For example, a device 250 associated with the operator 106 can include such NFC logic 256. In one exemplary embodiment, the device 250 is portable so that it can be carried around a work site by the operator 106. In one exemplary embodiment, the device 250 includes a processing unit that provides additional functionality, such as the ability to make phone calls, receive e-mails, take pictures, etc. The NFC logic (e.g., the NFC logic 256) renders the component (e.g., the device 250) capable of sending and/or receiving NFC transmissions.

The general inventive concepts contemplate welding systems, such as the MIG welding system 200, which include at least one NFC-enabled component. In this manner, the welding systems include at least one component for which data can be read from and/or written to, resulting in enhanced, dynamic welding systems.

Figure 4:
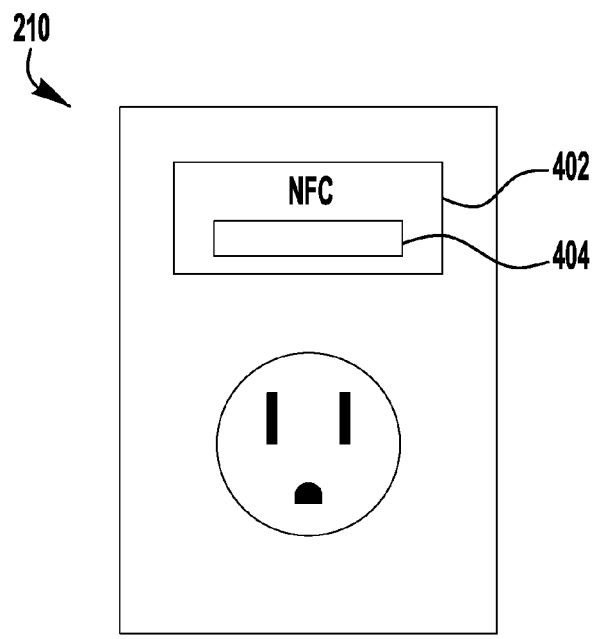
FIG. 4 is a schematic drawing of a power source including an NFC tag.

The power source 210 (e.g., a 110V electrical outlet) can be viewed as a component of the MIG welding system 200 to the extent it represents a power source for providing power (e.g., the input power 112) to the welder 202 so that the welder 202 can in turn generate and control power (e.g., the output power 114) for other components of the MIG welding system 200. In one exemplary embodiment, the power source 210 includes passive NFC logic 402 (see FIG. 4). The NFC logic 402 can take any suitable form. In one exemplary embodiment, the NFC logic 402 is a tag, sticker, or the like. In one exemplary embodiment, the tag is affixed to an outer surface of the power source 210. The tag is readily visible to and accessibly by a user (e.g., the operator 106).

As a passive device, the tag has no dedicated power supply. Instead, the tag functions as a target device 302 which includes NFC logic 304 and is powered by an electromagnetic field 306 generated by NFC logic 308 of an initiator device 310 (see FIG. 3A). The initiator device 310, as an active device, includes a dedicated power supply 312 (e.g., one or more batteries). In one exemplary embodiment, the initiator device 310 uses read instructions 314 communicated by the field 306 to read information stored on or otherwise associated with the target device 302. The read instructions 314 may be implemented by an NFC application (not shown) running on the initiator device 310. In one exemplary embodiment, the initiator device 310 uses write instructions 318 communicated by the field 306 to write information to the target device 302. The write instructions 318 can also be implemented or otherwise managed by the NFC application running on the initiator device 310.

The passive NFC logic 402 allows power source information 404 to be stored at or otherwise associated with the power source 210. The power source information 404 can include any information on the power source 210, such as its output power capabilities. The power source information 404 can be accessed by the initiator device 310 and used, for example, to verify that the power source 210 is capable of safely (i.e., rated for) providing sufficient output power for the welding process. If some deficiency or other issue is identified with the power source 210, the welding process can be prevented or otherwise delayed until said deficiency is remedied.

Figure 5:
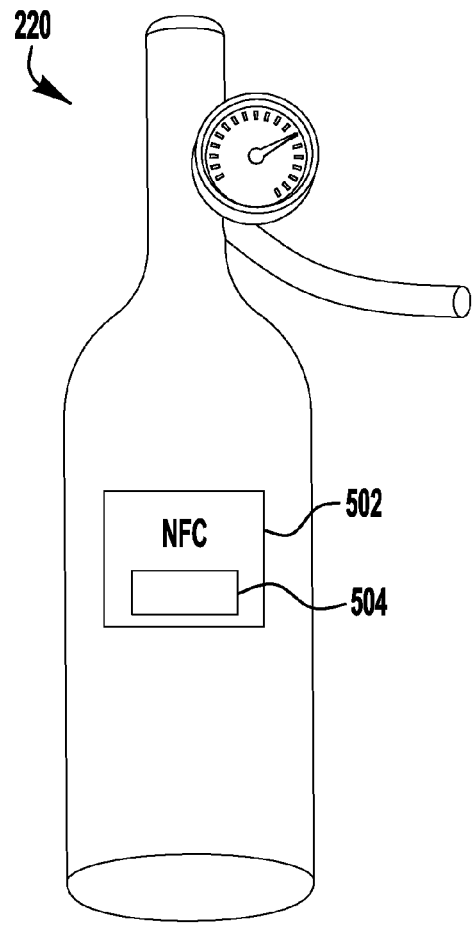
FIG. 5 is a schematic drawing of a gas source including an NFC tag.

In one exemplary embodiment, the gas source 220 includes passive NFC logic 502 (see FIG. 5). The NFC logic 502 can take any suitable form. In one exemplary embodiment, the NFC logic 502 is a tag, sticker, or the like. In one exemplary embodiment, the tag is affixed to an outer surface of the gas source 220 (e.g., one or more tanks containing the shielding gas 122). The tag is readily visible to and accessibly by a user (e.g., the operator 106).

As a passive device, the tag has no dedicated power supply. Instead, the tag functions as a target device 302 which includes NFC logic 304 and is powered by an electromagnetic field 306 generated by NFC logic 308 of an initiator device 310 (see FIG. 3A). The initiator device 310, as an active device, includes a dedicated power supply 312 (e.g., one or more batteries). In one exemplary embodiment, the initiator device 310 uses read instructions 314 communicated by the field 306 to read information stored on or otherwise associated with the target device 302. The read instructions 314 may be implemented by an NFC application (not shown) running on the initiator device 310. In one exemplary embodiment, the initiator device 310 uses write instructions 318 communicated by the field 306 to write information to the target device 302. The write instructions 318 can also be implemented or otherwise managed by the NFC application running on the initiator device 310.

The passive NFC logic 502 allows gas source information 504 to be associated with the gas source 220. The gas source information 504 can include any information on the gas source 220, such as a composition of the shielding gas 122 provided thereby. The gas source information 504 can be accessed by the initiator device 310 and used, for example, to determine whether the shielding gas 122 provided by the gas source 220 is proper for the particular welding process. If some deficiency or other issue is identified with the shielding gas 122, the welding process can be prevented or otherwise delayed until said deficiency is remedied.

Figure 6:
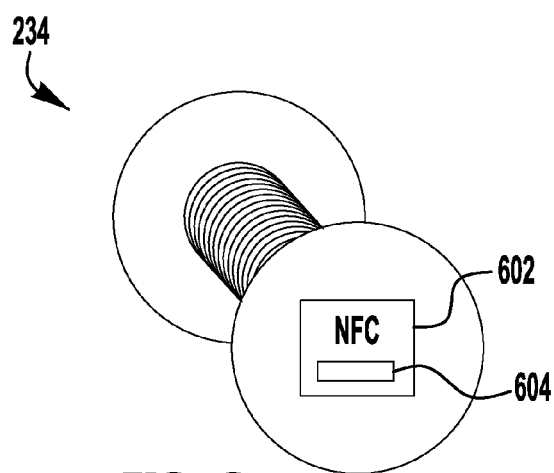
FIG. 6 is a schematic drawing of a wire source including an NFC tag.

In one exemplary embodiment, the wire source 234 includes passive NFC logic 602 (see FIG. 6). The NFC logic 602 can take any suitable form. In one exemplary embodiment, the NFC logic 602 is a tag, sticker, or the like. In one exemplary embodiment, the tag is affixed to an outer surface of the wire source 234 (e.g., a spool containing the welding wire 132). The tag is readily visible and accessible by a user (e.g., the operator 106).

As a passive device, the tag has no dedicated power supply. Instead, the tag functions as a target device 302 which includes NFC logic 304 and is powered by an electromagnetic field 306 generated by NFC logic 308 of an initiator device 310 (see FIG. 3A). The initiator device 310, as an active device, includes a dedicated power supply 312 (e.g., one or more batteries). In one exemplary embodiment, the initiator device 310 uses read instructions 314 communicated by the field 306 to read information stored on or otherwise associated with the target device 302. The read instructions 314 may be implemented by an NFC application (not shown) running on the initiator device 310. In one exemplary embodiment, the initiator device 310 uses write instructions 318 communicated by the field 306 to write information to the target device 302. The write instructions 318 can also be implemented or otherwise managed by the NFC application running on the initiator device 310.

The passive NFC logic 602 allows welding wire information 604 to be associated with the wire source 234. The welding wire information 604 can include any information on the wire source 234, such as a composition and/or size (e.g., diameter) of the welding wire 132 provided thereby. The welding wire information 604 can be accessed by the initiator device 310 and used, for example, to determine whether the welding wire 132 provided by the wire source 234 is suitable for the particular welding process. If some deficiency or other issue is identified with the welding wire 132, the welding process can be prevented or otherwise delayed until said deficiency is remedied.

Figure 7:
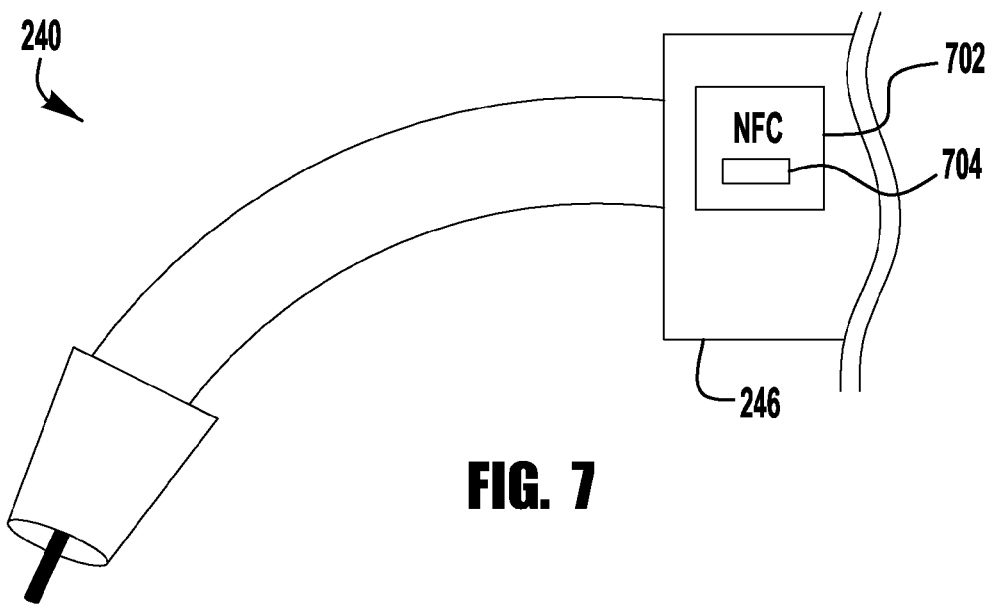
FIG. 7 is a schematic drawing of a welding torch including an NFC tag.

In one exemplary embodiment, the welding torch 240 includes passive NFC logic 702 (see FIG. 7). The NFC logic 702 can take any suitable form. In one exemplary embodiment, the NFC logic 702 is a tag, sticker, or the like. In one exemplary embodiment, the tag is affixed to an outer surface of the welding torch 240 (e.g., on in proximity to a handle 246 of the welding torch 240). The tag may be protected from the harsh welding conditions encountered near the welding torch 240 in any suitable manner. For example, the tag can be made from or otherwise surrounded by a heat resistant material to compensate for the harsh welding conditions. As another example, the tag can be disposed behind a removable panel or the like of the welding torch 240 in order to shield the tag from the harsh welding conditions. The tag is readily visible to and accessibly by a user (e.g., the operator 106).

As a passive device, the tag has no dedicated power supply. Instead, the tag functions as a target device 302 which includes NFC logic 304 and is powered by an electromagnetic field 306 generated by NFC logic 308 of an initiator device 310 (see FIG. 3A). The initiator device 310, as an active device, includes a dedicated power supply 312 (e.g., one or more batteries). In one exemplary embodiment, the initiator device 310 uses read instructions 314 communicated by the field 306 to read information stored on or otherwise associated with the target device 302. The read instructions 314 may be implemented by an NFC application (not shown) running on the initiator device 310. In one exemplary embodiment, the initiator device 310 uses write instructions 318 communicated by the field 306 to write information to the target device 302. The write instructions 318 can also be implemented or otherwise managed by the NFC application running on the initiator device 310.

The passive NFC logic 702 allows torch information 704 to be associated with the welding torch 240. The torch information 704 can include any information on the welding torch 240, such as a maintenance history of the welding torch 240. The torch information 704 can be accessed by the initiator device 310 and used, for example, to determine whether the welding torch 240 is in a satisfactory condition for performing the particular welding process. If some deficiency or other issue is identified with the welding torch 240, the welding process can be prevented or otherwise delayed until said deficiency is remedied.

Figure 8:
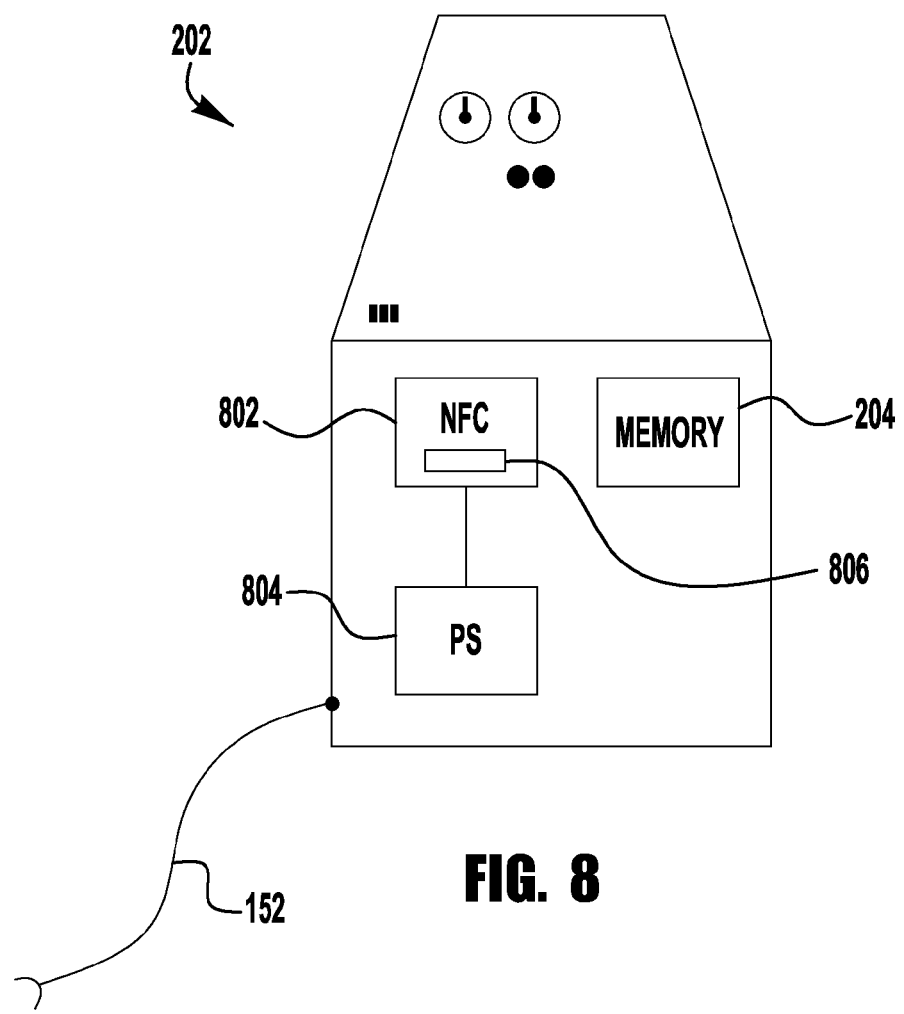
FIG. 8 is a schematic drawing of a welder including an NFC tag.

In one exemplary embodiment, the welder 202 includes active NFC logic 802 (see FIG. 8). The NFC logic 802 can take any suitable form. In one exemplary embodiment, the NFC logic 802 is a tag, sticker, or the like. In one exemplary embodiment, the tag is affixed to an outer surface of the welder 202 (e.g., a frame of the welder 202). The tag is readily visible to and accessible by a user (e.g., the operator 106).

As an active device, the tag has a dedicated power supply 804 (e.g., one or more batteries) which powers its NFC logic 802. In this manner, the tag can function as both an initiator device, such as the initiator device 310, and an active target device 330 (see FIG. 3B).

The target device 330 has its own power supply 332. The target device 330 further includes NFC logic 334 which can generate an electromagnetic field 336 similar to the electromagnetic field 306 generated by the initiator device 310. In this manner, the target device 330 and the initiator device 310 can engage in peer-to-peer communications with one another. Otherwise, when the target device 330 acts strictly as a target device, it functions in a manner similar to the target device 302 shown in FIG. 3A.

Figure 3A:
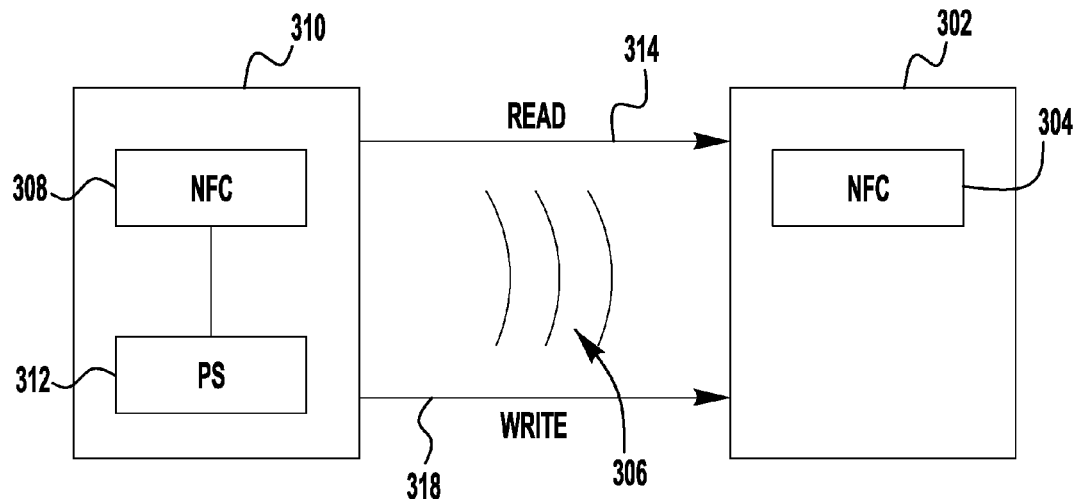
FIGS. 3A and 3B are schematic drawings of passive and active NFC devices or tags, respectively.

Conversely, when the target device 330 acts as an initiator device or a combination initiator-target device, it functions in a manner similar to the initiator device 310 shown in FIG. 3A. For example, the target device 330 uses read instructions 314 communicated by its field 336 to read information stored on or otherwise associated with the other device (e.g., the initiator device 310). The read instructions 314 may be implemented by an NFC application (not shown) running on the target device 330. In one exemplary embodiment, the target device 330 uses write instructions 318 communicated by its field 336 to write information to the other device. The write instructions 318 can also be implemented or otherwise managed by the NFC application running on the target device 330.

When the target device 330 acts as the initiator device 310, the welder 202 can use the NFC logic 802 to read data from and/or write data to another component of the MIG welding system 200 (as a target device). When the target device 330 acts as the target device 302, the welder 202 can use the NFC logic 802 to store welder information which can be read and/or written by another component of the MIG welding system 200 (as an initiator device). Accordingly, the welder 202 can participate in peer-to-peer communications with other components of the MIG welding system 200, including any operators (e.g., operator 106) thereof.

The active NFC logic 802 allows welder information 806 to be associated with the welder 202. The welder information 806 can include the power source information 404, the gas source information 504, the welding wire information 604, the torch information 704, and/or the wire feeder information 906, as well as any other information relating to the welding process, other components of the MIG welding system 200, and/or operators thereof.

The welder information 806 can be accessed by any initiator device 310 and used, for example, to determine the requirements and/or parameters associated with a particular welding process. If some deficiency, issue, problem, or the like, is identified from the welder information 806, the welding process can be prevented or otherwise delayed until said deficiency is remedied. In one exemplary embodiment, the deficiency is remedied automatically by the welding component representing the initiator device 310.

Figure 9:
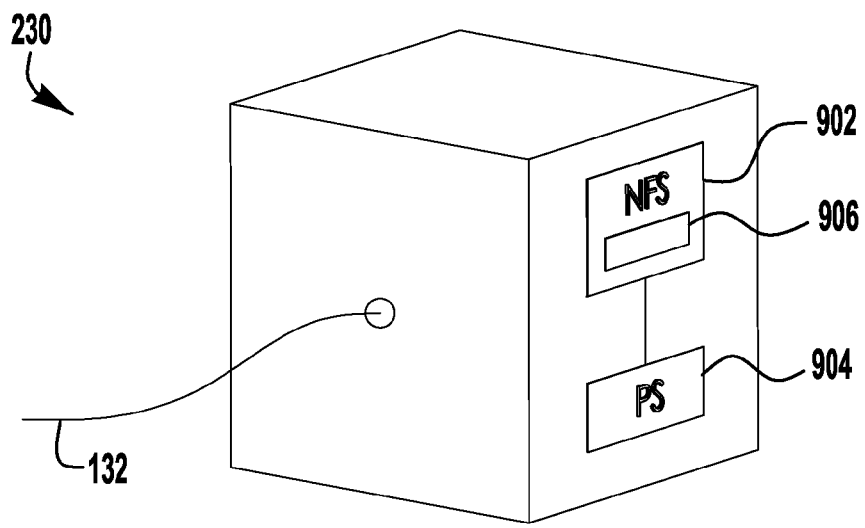
FIG. 9 is a schematic drawing of a wire feeder including an NFC tag.

In one exemplary embodiment, other components of the MIG welding system 200, instead of or in addition to the welder 202, can be active devices. For example, the wire feeder 230 includes active NFC logic 902 (see FIG. 9). The NFC logic 902 can take any suitable form. In one exemplary embodiment, the NFC logic 902 is a tag, sticker, or the like. In one exemplary embodiment, the tag is affixed to an outer surface of the wire feeder 230 (e.g., a housing of the wire feeder 230). The tag is readily visible to and accessibly by a user (e.g., the operator 106).

As an active device, the tag has a dedicated power supply 904 (e.g., one or more batteries) which powers its NFC logic 902. In this manner, the tag can function as both an initiator device, such as the initiator device 310, and an active target device 330 (see FIG. 3B).

The target device 330 has its own power supply 332. The target device 330 further includes NFC logic 334 which can generate an electromagnetic field 336 similar to the electromagnetic field 306 generated by the initiator device 310. In this manner, the target device 330 and the initiator device 310 can engage in peer-to-peer communications with one another. Otherwise, when the target device 330 acts strictly as a target device, it functions in a manner similar to the target device 302 shown in FIG. 3A.

Conversely, when the target device 330 acts as an initiator device or a combination initiator-target device, it functions in a manner similar to the initiator device 310 shown in FIG. 3A. For example, the target device 330 uses read instructions 314 communicated by its field 336 to read information stored on or otherwise associated with the other device (e.g., the initiator device 310). The read instructions 314 may be implemented by an NFC application (not shown) running on the target device 330. In one exemplary embodiment, the target device 330 uses write instructions 318 communicated by its field 336 to write information to the other device. The write instructions 318 can also be implemented or otherwise managed by the NFC application running on the target device 330.

When the target device 330 acts as the initiator device 310, the wire feeder 230 can use the NFC logic 902 to read data from and/or write data to another component of the MIG welding system 200 (as a target device). When the target device 330 acts as the target device 302, the wire feeder 230 can use the NFC logic 902 to store wire feeder information which can be read and/or written by another component of the MIG welding system 200 (as an initiator device). Accordingly, the wire feeder 230 can participate in peer-to-peer communications with other components of the MIG welding system 200, including any operators (e.g., operator 106) thereof.

The active NFC logic 902 allows wire feeder information 906 to be associated with the wire feeder 230. The wire feeder information 906 can include the power source information 404, the gas source information 504, the welding wire information 604, the torch information 704, and/or the welder information 806, as well as any other information relating to the welding process, other components of the MIG welding system 200, and/or operators thereof.

The wire feeder information 906 can be accessed by any initiator device 310 and used, for example, to determine the requirements and/or parameters associated with a particular welding process. If some deficiency, issue, problem, or the like, is identified from the wire feeder information 906, the welding process can be prevented or otherwise delayed until said deficiency is remedied. In one exemplary embodiment, the deficiency is remedied automatically by the welding component representing the initiator device 310.

In one exemplary embodiment, limitations of the wire feeder 230 can be communicated to the welder 202 via the wire feeder information 906, such that only those welding processes for which the wire feeder 230 is suitable would be displayed or otherwise made available to the operator 106.

Figure 10:
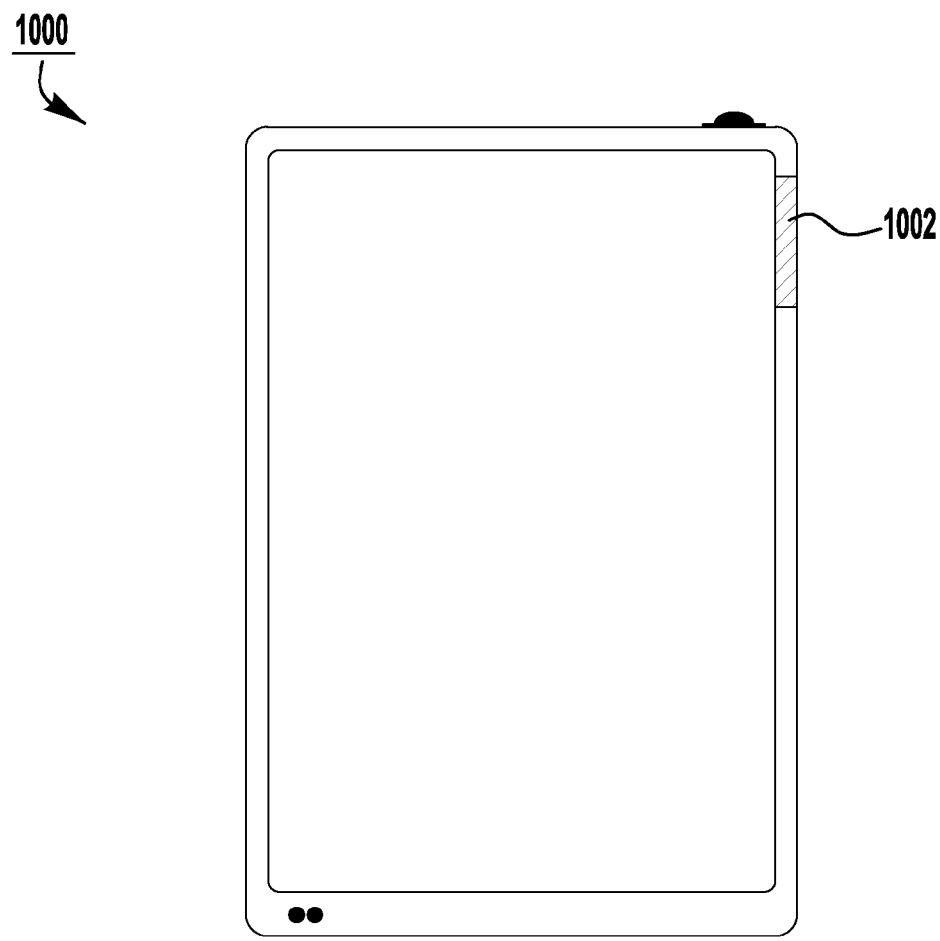
FIG. 10 is a schematic drawing of an operator device including active NFC logic.

In one exemplary embodiment, an operator device 1000 associated with the operator 106 includes active NFC logic 1002 (see FIG. 10). In one exemplary embodiment, the NFC logic 1002 is embedded in or otherwise integrated with the operator device 1000. In one exemplary embodiment, the NFC logic 1002 is implemented as an add-on component to the operator device 1000. For example, the operator device 1000 can be provided with NFC capability by interfacing the NFC logic 1002 with the device, such as by plugging it into a port, expansion slot, or the like of the device. The general inventive concepts contemplate that other components of a welding system (e.g., the MIG welding system 200) could be retrofit with NFC capability in a similar manner.

The operator device 1000 also includes an NFC application (not shown), which is software facilitating communications between the operator 106 and the various NFC-enabled components of the MIG welding system 200. For example, the NFC application can provide a user interface, as well as manage the exchange of data between NFC-enabled devices.

In one exemplary embodiment, the operator device 1000 is a mobile device. In one exemplary embodiment, the operator device 1000 is a smartphone. In one exemplary embodiment, the operator device 1000 is a portable computer. In one exemplary embodiment, the operator device 1000 is a tablet (see FIG. 10).

In one exemplary embodiment, the operator device 1000 is a relatively fixed computer. In this case, it may be necessary to bring an NFC-enabled component (e.g., a spool of wire including NFC logic) to the operator device 1000 in order for communications between the operator device 1000 and the component to be possible. In this case, the operator device 1000 may be able to share data with other components of the MIG welding system 200 (e.g., the welder 202) by means of a network, such as a wired or wireless Ethernet network.

One of ordinary skill in the art will appreciate that any number or combination of components in the MIG welding system 200 can be NFC-enabled. Furthermore, each such component can be configured for either passive or active NFC. Accordingly, the operator device 1000 can generally be used by the operator 106 to read data from and/or write data to any of the NFC-enabled welding components of the MIG welding system 200, such as the welder 202, the power source 210, the gas source 220, the wire feeder 230, the wire source 234, and the welding torch 240.

In one exemplary embodiment, the operator device 1000 can include authentication information which is used to implement or otherwise enforce access control in a welding system (e.g., the MIG welding system 200). For example, NFC tags are placed on one or more components of the welding system. The NFC tags include control information which defines access limits or requirements for the components. When the operator device 1000 is brought into proximity with any of the components, an NFC session is established to determine whether the authentication information on the operator device 1000 satisfies the access limits or requirements set forth in the control information of the component. In one exemplary embodiment, the operator 106 initiates the NFC session manually (e.g., by pressing a button, icon, or the like on the operator device 1000).

If the authentication information on the operator device 1000 satisfies the access limits or requirements set forth in the control information of the component, then the operator 106 possessing the operator device 1000 is granted access to the component. Here, access to the component can mean any level of access, such as only reading data from the component, reading data to and writing data from the component, and/or actual use of the component for its intended purpose. Indeed, the control information for a component of the welding system can set forth different levels of access, with the operator 106 only being able to access the component consistent with a level of access that can be established using the authentication information of the operator device 1000. If the authentication information on the operator device 1000 fails to satisfy the access limits or requirements set forth in the control information of the component, then the operator 106 utilizing the operator device 1000 is denied access to the component or any access to the component by the operator 106 is appropriately limited.

Furthermore, the use of information on the operator device 1000 can be extended to implement specific access control measures.

For example, in one exemplary embodiment, the operator device 1000 is uniquely associated with a particular operator (e.g., the operator 106). The operator device 1000 can include operator information relating to the operator 106, such as the operator's qualifications to perform a particular welding process.

The operator information can be used in any suitable manner within the MIG welding system 200. For example, the operator information can be used by the welder 202 and/or welding torch 240 to determine whether the operator 106 is certified to perform a particular welding process. If it is determined that the operator 106 lacks the requisite certification, the welder 202 and/or welding torch 240 could prevent the operator 106 from performing the welding process, such as by disabling equipment necessary for performing the welding process (e.g., the welder 202 and/or the welding torch 240).

As another example, in one exemplary embodiment, the operator device 1000 includes license key information. The license key information can, for example, define use permissions for licensed technology implemented in the components of a welding system (e.g., the MIG welding system 200).

Additionally, NFC tags are placed on one or more components of the welding system. The NFC tags include license information which defines access limits or requirements for the components in accordance with one or more licenses relating to the components. When the operator device 1000 is brought into proximity with any of the components, an NFC session is established to determine whether the license key information on the operator device 1000 satisfies the license requirements set forth in the license information of the component. In one exemplary embodiment, the operator 106 initiates the NFC session manually (e.g., by pressing a button, icon, or the like on the operator device 1000).

If the license key information on the operator device 1000 satisfies the license requirements set forth in the license information of the component, then the operator 106 possessing the operator device 1000 is granted access to the licensed component and/or additional licensed functionality of the component is made available to the operator 106. If the license key information on the operator device 1000 fails to satisfy the license requirements set forth in the license information of the component, then the operator 106 utilizing the operator device 1000 is denied access to the licensed component and/or any additional licensed functionality of the component.

Figure 11:
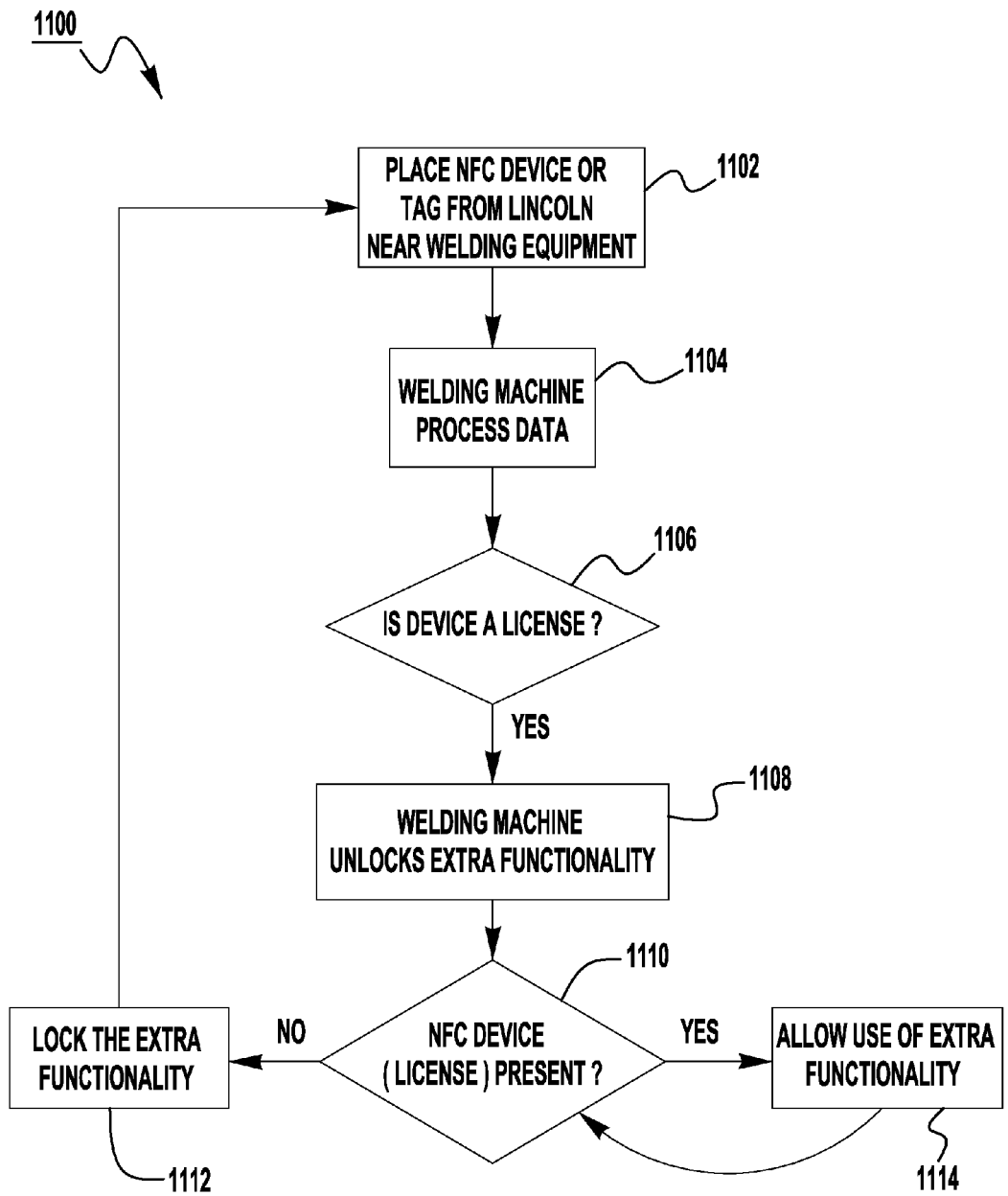
FIG. 11 is a logic flow chart of a process for limiting access to certain welder functions using NFC logic.

A method 1100 of enforcing a license in a welding system (e.g., the MIG welding system 200) is shown in FIG. 11.

According to the method 1100, an NFC device (e.g., the operator device 1000) or other NFC tag is brought in close proximity to welding equipment (e.g., the welder 202) by a user (e.g., the operator 106) at 1102. In one exemplary embodiment, close proximity means within 10 cm.

The welding equipment uses NFC to obtain data from the NFC device which is then processed at 1104. In particular, the data is evaluated to determine whether the NFC device constitutes a license at 1106. If it is determined that the NFC device does not constitute a valid license directed to licensed technology of the welding equipment, further processing halts (i.e., the method 1100 resets) and the user is denied access to the welding equipment and/or additional functionality covered by the license. Conversely, if it is determined that the NFC device does constitute a valid license directed to licensed technology associated with the welding equipment, processing continues to 1108. In 1108, access to the welding equipment and/or additional functionality, as the licensed technology, is made available to the user.

Thereafter, the method 1100 evaluates whether the NFC device remains in close proximity to the welding equipment at 1110. If it becomes the case that the NFC device is no longer in close proximity to the welding equipment, then the user is denied further access to the welding equipment and/or additional functionality at 1112 and further processing halts (i.e., the method 1100 resets).

On the other hand, as long as the NFC device remains in close proximity to the welding equipment, the user can continue to use the licensed welding equipment and/or additional functionality. In particular, steps 1110 and 1114 form a loop which is constantly or periodically checked to confirm that access to the welding machine or additional functionality, as the licensed technology, should remain available to the user.

In a welding system including NFC-enabled components, such as the MIG welding system 200, the capabilities of the welding system and underlying components can be extended to provide an enhanced welding system. For example, using NFC, the components of the welding system can store or otherwise be associated with information, and that information can readily be accessed and used by other components of the welding system. NFC tags present a low-cost solution to adding information to "dumb" devices (i.e., those lacking a dedicated processing unit), such as a spool of wire. For passive NFC tags, no dedicated power source is needed and the tags can have a relatively small footprint. Furthermore, operators of the welding system can readily configure and exchange data with the NFC-enabled components, as well as implement various access control mechanisms. Further still, the NFC transmissions between components and/or operators of the welding system are relatively secure owing to their requirement of close proximity and use of encryption and/or other protection mechanisms. Thus, the general inventive concepts extend to any number of (such as automated, manual, hard automated or semi-automated systems) and all welding processes, including, without limitation, MIG, TIG, GMAW, gas brazing, submerged ARC welding, flux-cored welding, and any other welding processes and methods (a non-exhaustive list of welding processes for which this invention could be used is provided in the attached Appendix 3, which is incorporated herein in its entirety). NFC can be used to enhance the overall capabilities of any of these welding systems and methods.

The general inventive concepts extend, for example, to systems and methods for enabling arc welders. By way of overview, in electric arc welding, specific applications often involve a welding procedure specification (WPS) that must be followed for acceptance of the weld. In practice, the WPS for a specific application provides the necessary information to set the electric arc welder and load the electric arc welder with external constituents for the purposes of performing the specified welding process.

In accordance with one exemplary embodiment, the WPS for a given welding operation is converted to digital data and stored in a memory of a portable, local device (e.g., a smartphone or tablet, such as the operator device 1000). In one exemplary embodiment, the WPS could be stored in a remote location such as a computer connected to the welder by a network, such as an Ethernet network. Any suitable network would suffice, from a local area network to the Internet. The computer and/or welder could employ a wireless connection to the network.

In one exemplary embodiment, the digital data comprising the WPS of a specific welding operation is loaded into a memory of a portable device. In various exemplary embodiments, the portable device is instead loaded with a code (e.g., a URL or other network address) which allows the digital data defining the WPS to be directed to the digital process controller of the welder (e.g., over a network). The portable device uses NFC to transmit or otherwise direct the WPS or code to the controller of the electric arc welder.

Thus, the general inventive concepts encompass the use of NFC for communicating a specific digital data defining WPS or a code identifying a specific WPS to a component of a welding system (e.g., a controller of a welder). In the latter case, the digital data defining the WPS is loaded directly into the controller of the welder from an external source, such as an Ethernet network, accessed using the code.

Figure 12:
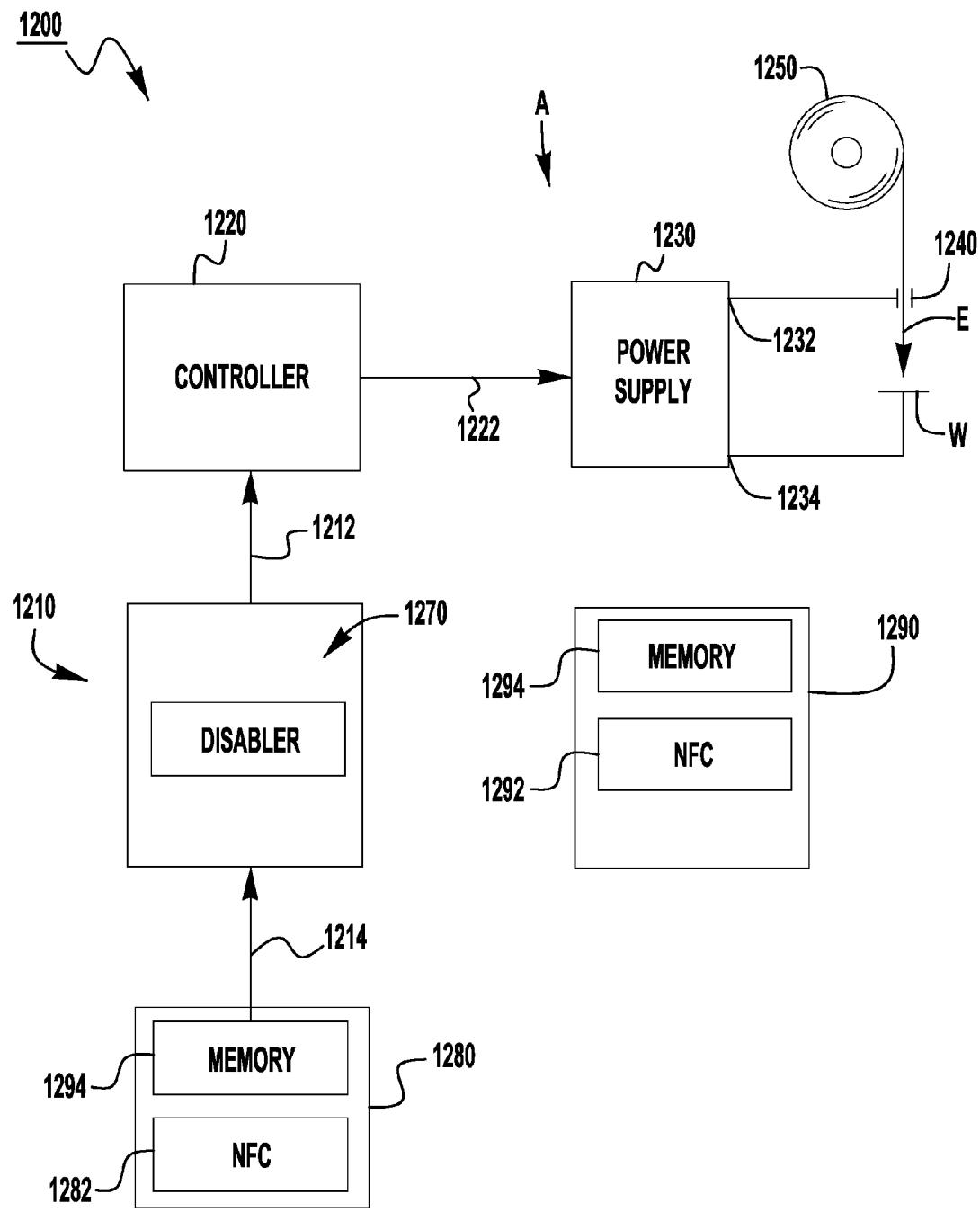
FIG. 12 is a logic flow chart of a process for securing calibration data to welding devices that comprise a welding system.

As shown in FIG. 12, a welding system 1200, according to one exemplary embodiment, includes a system 1210 that is used to provide control data by line 1212 to determine the operation of welder A by controller 1220. The controller is a standard digital processing device for outputting command signals on line 1222 to govern the operation of power supply 1230, shown as having positive terminal 1232 and negative terminal 1234. Of course, these terminals can be from a switching network with alternate polarity or can be from a rectifier to give specific polarity for AC, DC positive, or DC negative welding. The power supply 1230 can be, for example, an inverter, down chopper, or other power source architecture. Welder A performs a welding operation at a station schematically illustrated as contact sleeve 1240 for directing current to welding wire or electrode E from supply spool 1250 toward workpiece W. In some instances, a stick electrode may be used. Controller 1220 causes welder A to perform any of a variety of welding processes involving weld parameters (e.g., Ia, Va, WFS), electrical characteristics (e.g., AC, DC+, DC−), and other definitions of the welding mode (e.g., pulse, spray, globular, short circuit, STT).

System 1210 includes a disabling circuit 1270 which will not allow controller 1220 to operate unless an enable output is received from the disabling circuit.

System 1210 also includes a communications means 1280 that includes NFC logic 1282 and a memory 1284 or other storage means. The NFC logic 1282 can be active or passive. The communications means 1280 can also include a processing unit. The communications means 1280 provides NFC functionality to the system 1210. The NFC logic 1282 is operable to communicate (i.e., exchange digital data) with NFC logic 1292 of a portable device 1290, as described herein, to receive digital data therefrom (see FIGS. 3A-3B). The NFC logic 1292 can be active or passive. The digital data transmitted from the portable device 1290 to the system 1210 (via communications means 1280) is indicative of a particular welding procedure specification (WPS). The WPS dictates the parameters of welder A, as well as controls disabling circuit 1270.

The portable device 1290 can include a memory 1294 or other storage means, in addition to the NFC logic 1292. Prior to its transmission to the system 1210, the digital data can be stored in the memory 1294 of the portable device 1290. The portable device 1290 can also include a processing unit. In one exemplary embodiment, an interface of the portable device 1290 allows a user (e.g., the operator 106) to navigate amongst a plurality of welding procedure specifications in order to specify which WPS is to be sent. In one exemplary embodiment, the portable device 1290 is the operator device 1000 (see FIG. 10).

In one exemplary embodiment, the disabling circuit 1270 is implemented or otherwise controlled by an internal processing unit. In one exemplary embodiment, the disabling circuit 1270 is implemented or otherwise controlled by an external processing unit, such as a processing unit in the communications means 1280. The disabling circuit 1270 can receive information, such as the digital data, from the communications means 1280 over line 1214.

Information on one or more external items is also provided to the system 1210. For example, this information could be sent to the system 1210 via an NFC transmission (e.g., from a welding component) which is received by the communications means 1280. As another example, this information could be sent to the system 1210 over a network, such as an Ethernet network connecting various welding components.

The information can relate to any one or more actual external items pertinent to a welding process to be performed by the welder A. For example, the information could be indicative of the wire E on spool 1250. As another example, the information could be indicative of the gas used for shielding the welding process. As yet another example, the information could be indicative of a qualification of the person operating welder A (e.g., the operator 106).

Once the WPS data and information on any external items has been provided, the system 1210 can proceed with its analysis. In particular, the welding procedure specification from the digital data is input to the controller 1220 and the individual aspects of the WPS (corresponding to the input external items) are compared against the WPS by the disabling circuit 1270. If there is coincidence of data between the desired operation of the welding procedure specification and the external items, an enable signal is directed to the controller 1220 through line 1212. This line also inputs other information relating to the WPS to be performed by welder A. This data bypasses the disable circuit 1270. Welder A is controlled by parameters from the WPS. If welder A is not capable of performing the desired parameters, controller 1220 does not initiate welding.

The inclusion of NFC logic in one or more components of the welding system 1200, and the portable device 1290, allows for WPS information to be readily, selectively, and securely delivered to the welder A. Furthermore, use of NFC logic in various welding components can eliminate or reduce the need for a network spanning the components of the welding system 1200. Further still, it is not be necessary to have dedicated power sources at welding components or items in order for the welding components or items to communicate their data (e.g., the information on external items). Furthermore, the disabling circuit 1270 aids in insuring that the controller 1220 only initiates welding when there is coincidence between the desired WPS and the external items related to the welding process to be performed.

The general inventive concepts extend, for example, to systems and methods for controlling a welding process or cycle of an arc welder.

The systems and methods include digital state tables stored in a memory (e.g., the memory 204) or similar structure of the arc welder (e.g., the welder 202). Each of these state tables includes a plurality of digitally coded welding parameters indicative of a selected function of a specific welding cycle. This information is collectively referred to as weld cycle information herein. One state is performed and completed before the next state is processed. This continues until a total cycle is performed. A weld controller includes means for converting the selected function of a specific digital state in the state table into welding parameters at the output of the arc welder operated by the weld controller.

As described herein, the systems and methods can employ a large number of the digital state tables and/or other digital programs which are input or otherwise provided by near field communications (NFC) to the arc welder and/or any related structure (e.g., the weld controller for operating the arc welder). In this manner, the library of weld cycle information available to a welding operator (e.g., the operator 106) is dynamic and can be readily changed. For example, customized and/or new weld cycle information can be created or otherwise obtained outside the welder and then readily loaded therein using NFC.

Figure 13:
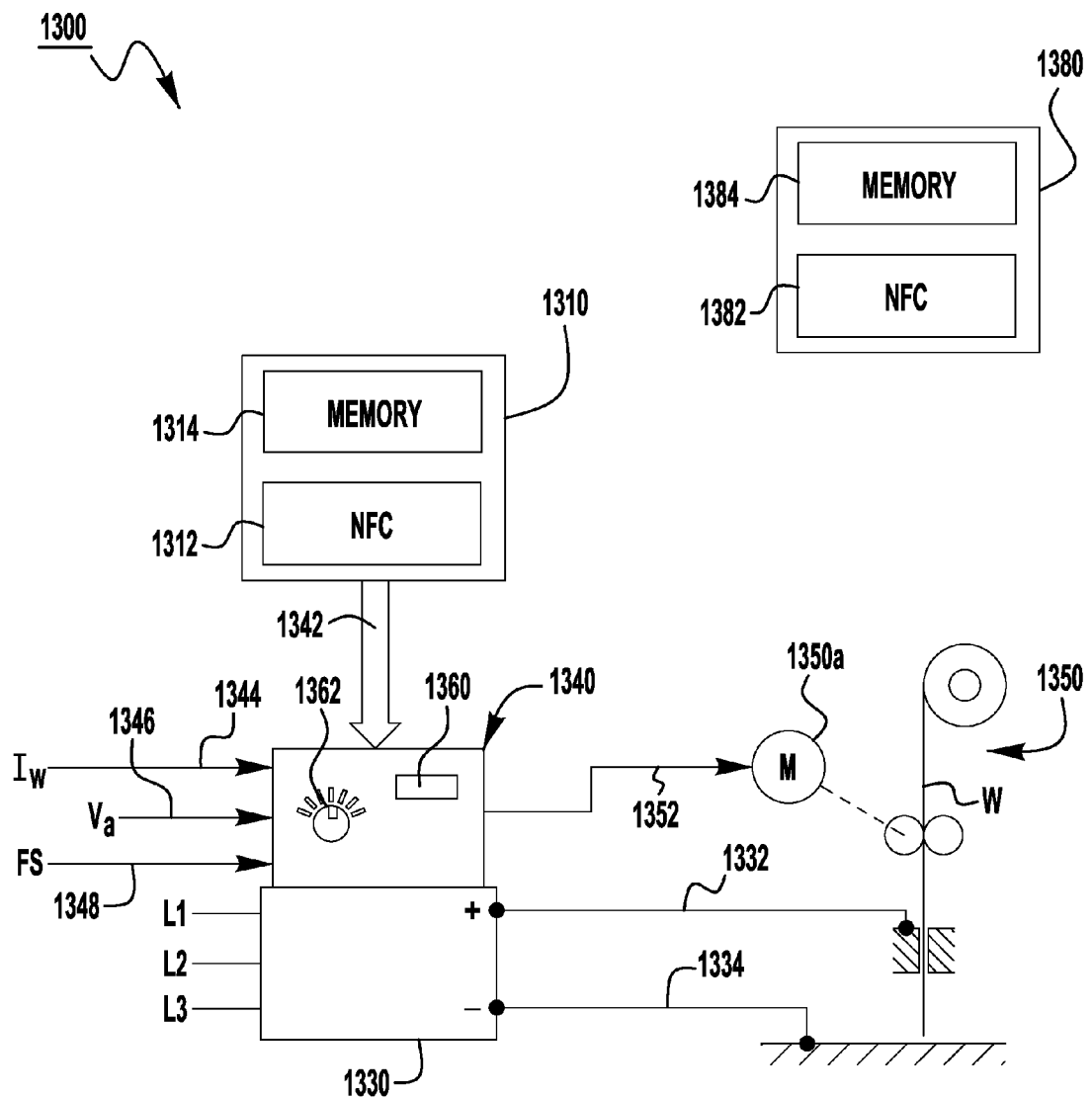
FIG. 13 is a logic flow chart of a method for setting up and calibrating a welding system using NFC devices.

As shown in FIG. 13, a welding system 1300, according to one exemplary embodiment, includes communications means 1310 that includes NFC logic 1312. The NFC logic 1312 can be active or passive. The communications means 1310 can also include a memory 1314 or other storage means. The communications means 1310 can also include a processing unit. The communications means 1310 provides NFC functionality to the system 1300.

Figure 3B:
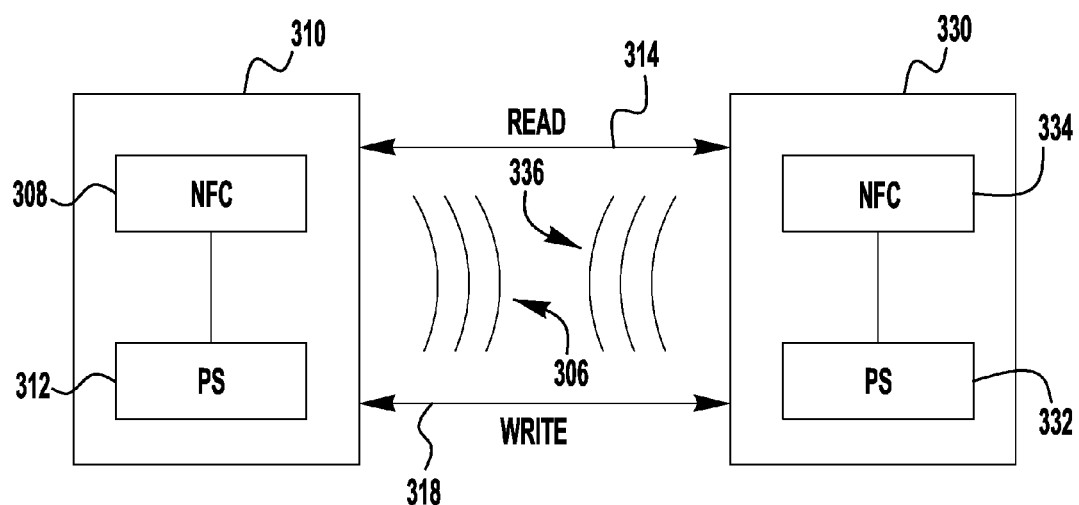

The NFC logic 1312 is operable to communicate (i.e., exchange digital data) with NFC logic 1382 of a portable device 1380, as described herein, to receive digital data therefrom (see FIGS. 3A-3B). The NFC logic 1382 can be active or passive. The digital data transmitted from the portable device 1380 to the communications means 1310 is directed to weld cycle information. The weld cycle information and/or associated data contains all of the parameters for performing a given generic welding process, such as tungsten inert gas (TIG), MIG, synergetic MIG/MAG pulse welding, etc. Each of the state tables included in the weld cycle information relates to a finite welding cycle which is to be performed in a series of individual steps or states by the welding equipment of the welding system 1300. The steps or successive states are defined by specific parameters.

The communications means 1310 is connected to or otherwise interfaces with a weld controller 1340 via an interconnect line 1342. The weld controller 1340 includes inputs 1344, 1346 and 1348 so that the actual welding current $I_w$, the arc voltage $V_a$ and the wire feed speed FS can be sensed and input into the controller 1340, on lines 1344, 1346, 1348, respectively, for the purpose of adaptively implementing the state table loaded from the communications means 1310 into the controller 1340 for performing any given welding process, pulse profile, or cycle.

In one exemplary embodiment, a digitally loaded program from communications means 1310 is loaded into controller 1340. The controller 1340 inputs information from the welding operation through lines 1344, 1346 and 1348 for performing the particular welding cycle with the architecture constraints of the cycle dictated by the state table or look up table loaded into the controller. A wire feeder 1350 is controlled by the weld controller 1340 through a control line 1352 for driving motor 1350*a* in accordance with the desired feed speed FS of the particular welding cycle of the state table loaded into the weld controller.

Referring now more particularly to weld controller 1340, this controller has a standard read out meter 1360 and a manual control 1362 for controlling wire speed or any other desired manual manipulation to be performed by the welding operator during the weld cycle. In many instances, there is no manual manipulation of any welding parameter during the processing of a customized welding cycle by the controller 1340. The illustration of a manual control 1362 in the form of a knob is illustrative in nature and shows the versatility of the welding system 1300.

The welding system 1300 allows additional operations to be employed by merely loading additional generic or semi-generic state tables into the welding equipment of the welding system 1300. The welding equipment (e.g., the NFC-enabled components) of the welding system 1300 can be provided with dedicated or shared memory areas for storing the weld cycle information and/or any other related information. For example, prior to its transmission from the portable device 1380, the weld cycle information can be stored in the memory 1384 of the portable device 1380. Upon receipt of the weld cycle information by the communications means 1310, the weld cycle information can be stored in the memory 1314 of the communications means 1310. Thus, any number of customized state tables could be added to the welding system 1300, provided sufficient memory or other storage exists. Accordingly, the welding system 1300 is also readily scalable.

Figure 14:
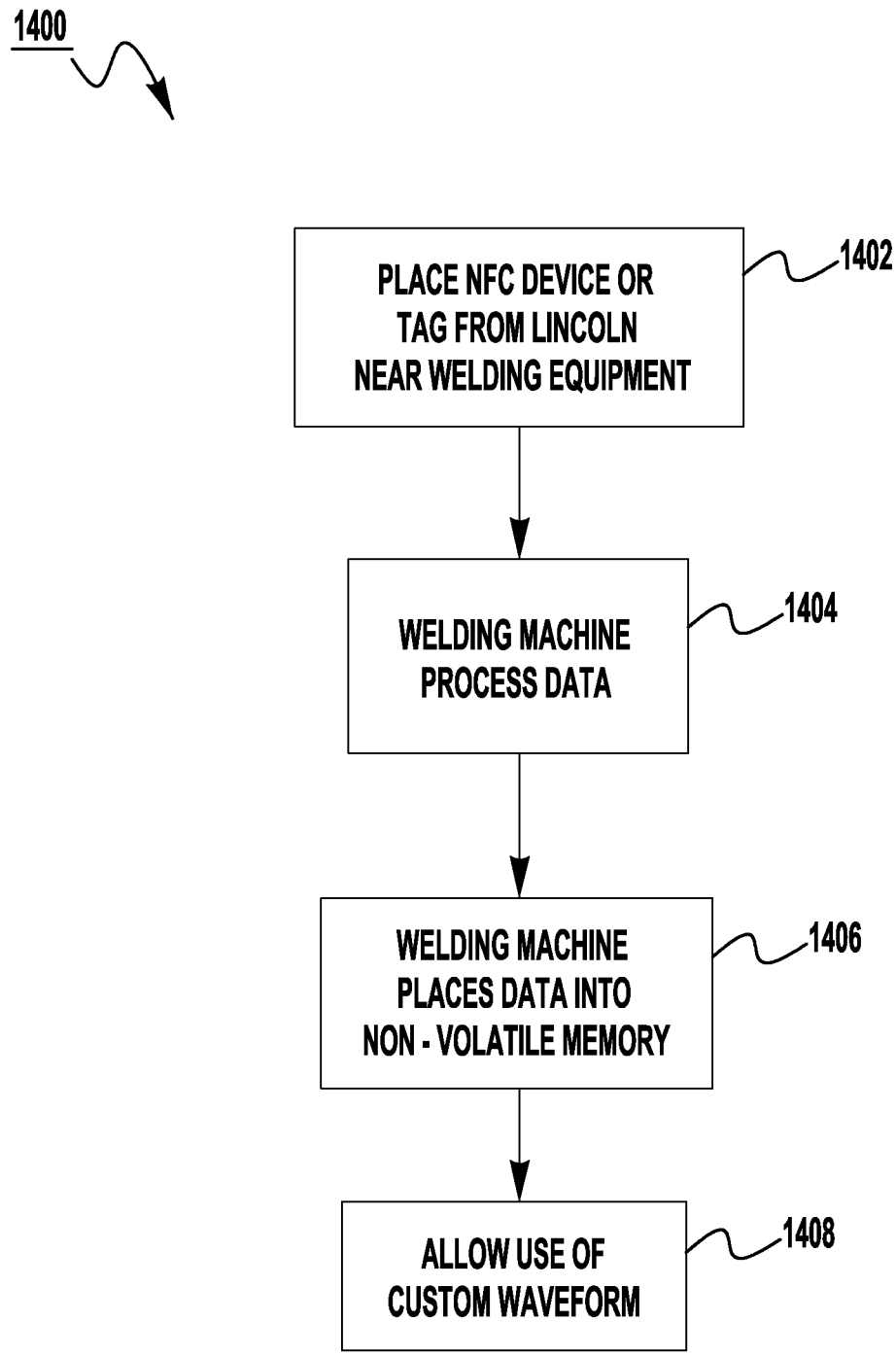
FIG. 14 is a logic flow chart of a method for configuring a network for a welding system using NFC tags.

A method 1400 of communicating weld cycle information, such as customized weld cycle information, to a welding system (e.g., the MIG welding system 200), according to one exemplary embodiment, is shown in FIG. 14.

According to the method 1400, an NFC device (e.g., the operator device 1000) or other NFC tag is brought in close proximity to welding equipment (e.g., the welder 202) by a user (e.g., the operator 106) at 1402. In one exemplary embodiment, close proximity means within 10 cm.

The welding equipment uses NFC to obtain data (e.g., the weld cycle information) from the NFC device which is then processed at 1404. The data is stored in a memory of the welding equipment at 1406. In one exemplary embodiment, the data is stored in an external storage device accessible by the welding equipment.

The welding equipment retrieves the data (e.g., from the memory) and uses it to carry out a welding operation at 1408.

Because the systems and methods can readily import additional weld cycle information, the systems and methods can be efficiently and securely updated, improved, and changed, without changing any structure, except the software which defines the state tables for the various types of weld cycles. As a result of this enhanced adaptability, the systems and methods should have extended applicability.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are equally applicable to both manual welding systems and processes and automated welding systems and processes.

Furthermore, notwithstanding any exemplary methods disclosed herein, more or fewer steps may be present in other methods encompassed by the general inventive concepts. Likewise, the order in which the steps are performed can change in different embodiments. It is sought, therefore, to cover all such changes and modifications as fall within the spirit and scope of the general inventive concepts, as described and illustrated herein, and any and all equivalents thereof.

What is claimed is:

1. A welding system comprising:
   a welder;
   a wire feeder;
   a welding torch;
   an operator device associated with an operator of the welding system;
   an NFC tag attached to at least one of the welder, the wire feeder, and the welding torch; and
   a communication means connected to a weld controller of the welder, the communication means for receiving NFC signals;
   wherein the welding system supports a plurality of functions, the functions including a first function that does not require a license and a second function that does require the license;
   wherein if an NFC signal representing a welding waveform is received by the communication means, the weld controller uses the welding waveform to control a welding process;
   wherein if an NFC signal representing welding wire information is received by the communication means, the weld controller confirms that the welding wire information is proper before allowing the welding process to commence; and
   wherein the communication means periodically checks to confirm the presence of the operator device within a predetermined vicinity of the welding system, such that:
   (i) if an NFC signal representing the license is received by the communication means from the operator device within the vicinity, the operator is granted access to the first function and the second function so long as the operator device remains in the vicinity; and
   (ii) if an NFC signal representing the license is not received by the communication means from the operator device within the vicinity, the operator is granted access to the first function but not the second function.

2. The welding system of claim 1, wherein the operator device is a smartphone.

3. The welding system of claim 1, wherein the operator device is a tablet computer.

4. The welding system of claim 1, wherein the operator device is operable to send an NFC signal representing qualifications of the operator for the welding process.

5. The welding system of claim 1, wherein the NFC tag is an active NFC tag.

6. The welding system of claim 1, wherein the NFC tag is a passive NFC tag.

* * * * *